Jan. 17, 1939.　　　F. W. FETTERMAN　　　2,144,567

ASPARAGUS TRIMMING MACHINE

Filed Jan. 5, 1937　　　5 Sheets-Sheet 4

Inventor

Frank W. Fetterman,

By

Attorney

Jan. 17, 1939. F. W. FETTERMAN 2,144,567
ASPARAGUS TRIMMING MACHINE
Filed Jan. 5, 1937 5 Sheets-Sheet 5

Patented Jan. 17, 1939

2,144,567

UNITED STATES PATENT OFFICE 2,144,567

ASPARAGUS TRIMMING MACHINE

Frank W. Fetterman, Sacramento, Calif., assignor to Libby, McNeill & Libby, Chicago, Ill., a corporation of Maine Application January 5, 1937, Serial No. 119,163

32 Claims. (Cl. 146—82)

The invention relates to a machine for trimming asparagus and other material.

Asparagus as delivered to a plant is not cut to canning requirements and it becomes necessary to cut the spears or stalks to a definite length to fit the particular size of can being used. Each size can requires a different length of cut spears and inasmuch as several different lengths may be under process of handling or trimming at the same time, such asparagus spears are usually sorted to size or grade and each size placed in forms for that particular requirement. Asparagus spears in the forms have been cut by various methods. One of the common practices has been to use any kind of a hold down pad on top of the spears in the forms during the time that the surplus butts are being cut off and carried away from the good spears. The hold down pad usually held by one or both hands generally comes in fairly close proximity to or in contact with the cutting knife and numerous mishaps in placing or handling the pad have resulted from the use of such pads and in some cases serious injuries have occurred.

It is an object of the present invention to provide an asparagus trimming machine of simple, durable and comparatively inexpensive construction capable of performing all of the necessary functions incident to cutting asparagus to any desired length with added safety features afforded by mechanism for holding down the asparagus in the forms while it is being cut so that there will be no occasion for an attendant or operator placing his hand or hands in close proximity to the disk knife or other form of cutter whereby all liability of bodily injury incident to the operation of the machine will be entirely eliminated.

A further object of the invention is to provide an asparagus trimming machine equipped with an asparagus depressing assembly provided with a depressing pad which will be accurately maintained the same distance laterally from the disk knife during each and every cut made by the machine irrespective of the length to which the spears of asparagus are cut so that the spears in the forms will be firmly held in proper position for accurately trimming the butts from the asparagus spears.

Another object of the invention is to provide a safety stop arranged to hold an asparagus receiving form spaced a safe distance from the cutting knife and capable of positively holding the form away from the knife and of preventing the form from moving toward the knife until properly and automatically released by the operating mechanism, whereby ample time is afforded the operator to place with safety the form in proper position on the machine before the form starts to travel toward the knife.

Another object of the invention is to provide an automatic starting mechanism which will permit or produce movement of the form towards the knife only after the form is placed in proper position on the guiding means which guides the form accurately to and past the knife and insures absolute accuracy in the trimming operation.

A further object of the invention is to mount the depressing pad for operation on the depressing assembly in fixed relation to the knife so as to assure a uniform manner of depressing the asparagus spears in the position for trimming the same.

Another object of the invention is to provide a safety stop switch mechanism which operates to stop the travel of the depressing assembly at the end of each individual cutting operation thereby avoiding continuous travel of the depressing assembly and the possibility of the same contacting with the form before the latter is placed in proper position on the machine.

Another object of the invention is to provide mechanically timed means for operating the depressing pad to move the same downwardly into engagement with the asparagus spears in the forms and to raise the depressing pad from the forms at exactly the proper time.

It is also an object of the invention to provide a full mechanically operated apparatus which may be manually operated when the motive power mechanism for moving the form and the depressing assembly is not in use.

A further object of the invention is to provide an asparagus trimming machine which when used in its entirely mechanically operated form will effect a material saving in the time of an operator and which will be found reliable and most desirable when mechanically operated.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

Fig. 2 is a plan view of the same.

In the accompanying drawings in which is illustrated the preferred embodiments of the invention and referring particularly to the mechanically operable form of the invention illustrated in Figs. 1 to 11, inclusive, of the drawings 1 designates an asparagus assorting table which may be of any desired construction and which is preferably provided with a wooden top 2 having a metal deck 3 extending over the portion of the asparagus assorting table containing the asparabus trimming mechanism. The asparagus assorting table is provided with suitable legs 4 and the metal deck 3 may be of any desired dimensions and protects the table top and enables the same to serve its particular needs. The table top 2 is supported by a suitable frame 5 including a metal table facia 6 consisting preferably of a channel member on which certain portions of the machine are mounted and which forms a firm support for the same.

The safety asparagus cut off device is mounted at one end of the asparagus assorting table and to assure proper cutting length, which must be true and straight the asparagus forms 7 are placed on a form guide track 8 consisting of a rail extending longitudinally of the table and suitably secured to the same in parallelism with and spaced from the front edge of the table top. The asparagus forms 7 are provided with a groove 9 properly spaced in the bottom of each asparagus form 7 to assure a proper guiding of the form during the cutting operation.

The asparagus form consists of a box or receptacle open at the top and rear and provided in its side walls with vertical openings 10 to provide a passageway for a disk knife 11 which severs the butts from the asparagus spears when the form is moved past the disk knife as hereinafter described. The form guide track 8 is preferably rounded at the upper face or tread and the groove 9 is curved to conform to the configuration of the track but any other suitable form of track may of course be employed for guiding the form in its forward movement past the knife disk 11.

The asparagus depressing and holding assembly which is slidable horizontally in a direction longitudinally of the table and also vertically to lower and raise a depressing pad 12 comprises in its construction a slidable frame or carriage 13 composed of upper and lower horizontal sleeves 14 and spaced vertical sleeves 15 rigidly connected with and forming substantially an integral part of the spaced upper and lower horizontal sleeves 14 which are slidably arranged on upper and lower horizontal guide rods 16. The guide rods 16 which are located at the front side of the table are mounted in brackets 17 preferably consisting of angle plates bolted or otherwise secured to the metal facia 6. The brackets 17 have outwardly extending vertical flanges through which extend the ends of the guide rods 16 which are provided with set collars 18 adjustably securing the guide rods in the supporting brackets 17. The slidable frame or carriage 13 which is movable longitudinally of the guide rods 16 is cushioned at the end of its movement in each direction by means of front and rear cushioning springs 19 and 20 consisting of coil springs disposed on the guide rods 16 and adjustably positioned thereon by set collars 21 and 22 and directly engaged at their outer ends by bumper collars 23 and 24 which protect the springs and which are engaged by the horizontal sleeves 14 of the slidable frame 13.

The vertical sleeves 15 of the slidable frame slidably receive spaced parallel sides of a depressing yoke 25 of approximately U-shape composed of the said sides and a top connecting portion. The top portion 26 of the depressing yoke constitutes a handle for enabling the depressing assembly to be manually manipulated when desired and the said top handle portion 26 is preferably deflected outwardly slightly as clearly illustrated in Fig. 5 of the drawings. The depressing pad 12 which is disposed horizontally consists of a substantially oblong plate and extends approximately from one end of the asparagus form or receptacle 7 to the other end thereof as clearly illustrated in Fig. 2 of the drawings and it is secured to one leg of an approximately inverted U-shaped arm or member 27 which has its other leg connected with the vertically movable depressor yoke by a horizontal plate 28 of substantially arcuate form. The ends of the plate 28 are secured to the sides of the depressible yoke and the adjacent end of the inverted U-shaped arm 27 is secured to the said plate 28 approximately centrally thereof adjacent the rear or inner edge of the plate 28. The plate 28 is connected adjacent its front edge and centrally thereof with the upper end of a depressing coil spring 29 extending downwardly from the plate 28 at a slight inclination and connected at its lower end with the slidable frame by a sectional clamp 30. The sectional clamp 30 is composed of front and rear horizontal sections having approximately semicircular terminal portions 31 and secured together by bolts 32 or other suitable fastening devices which maintain the sectional clamp in tight engagement with the vertical sleeves of the slidable frame. The depressing spring 29 which urges the vertically slidable yoke 25 and the depressing pad 12 downwardly maintains the depressing pad in firm engagement with the asparagus spears and assists the operation of the depressing assembly when the mechanism is manually operated.

The vertical sliding movement of the depressing yoke 25 is limited by upper set collars 33 and lower set collars 34 and 35 which also adjustably secure a bracket 36 to the bottom of the yoke. The lower set collars 34 and 35 may be formed integral with the bracket 36 and consist of tubular bosses but separate set collars may be provided if desired. The upper and lower set collars are normally spaced from the slidable frame 13 in the operation of the machine. The bracket 36 consists of a vertical front plate provided at the top with an outwardly extending horizontal flange 37 and having at its rear face a vertical guideway 38 receiving a block 39 carrying a horizontal pin 40 on which is mounted a cam controlled roller 41. The pin 40 is preferably threaded into the block 39 and the latter is vertically movable in the guideway 38 and is cushioned by a coiled spring 42 which is interposed between the block 39 and the bottom wall 43 of said guideway. The guideway which may be of any suitable construction may be conveniently formed by a backplate 44 spaced from the front plate of the bracket 36 by spaced blocks or members 44ᵃ located at the side edges of the bracket. The backplate 44 is provided with a vertical slot 45 through which the pin 40 extends and the said backplate may be secured to the spacing members 44ᵃ and the latter secured to the front plate of the bracket 36 by any suitable means. The guideway is closed at the bottom by a bottom wall 43. The pin 40 projects rearwardly from the bracket 36 and the cam controlled roller 41 which is mounted on the pin is arranged to be engaged by a horizontal cam track 46 supported below the facia member 6 by suitable hangers 47 and having a bevelled rounded cam edge 48 at its rear end for guiding the roller 41 to a position beneath the cam track 46 when the cam controlled roller 41 in the rearward movement of the depressing assembly is carried beyond the rear end of the cam track 46 and is permitted to drop below the upper face of the cam track as illustrated in dotted lines in Fig. 1 of the drawings for causing the depressing plate to drop into the asparagus receiving form and apply pressure to the asparagus spears. When the roller incident to the forward movement of the depressing assembly is carried into engagement with the lower face of the cam track 46 the coiled spring 42 is compressed and cushions the cam roller and the depressing assembly and cooperates with the depressing spring 29 in applying a firm but yieldable pressure to asparagus spears within the form 7. The upper portions of the hangers 47 are bolted or otherwise secured to angle plates 49 which are secured at spaced points to the metal facia member 6.

The depressing assembly in the operation of the asparagus trimming machine is carried past the disk knife 11 by the means hereinafter described to cut off the butts of the asparagus spears as clearly illustrated in Fig. 2 of the drawings. As the cam controlled roller approaches the forward end of the cam track 46 it is carried into engagement with an inclined cam track section 50 located beneath and in spaced relation to the horizontal cam track section 46 and arranged to cause the roller 41 to lift a pivoted switch section 51 and move upwardly and forwardly past the same and onto a horizontal extension 52 of the inclined cam track section 50. The switch 51 normally bridges the space between the horizontal cam track section 46 and the horizontal track extension 52 and enables the cam controlled roller in the backward or return movement of the depressing assembly to ride over it and pass from the horizontal extension 52 onto the upper face of the cam track 46.

The front end 53 of the switch 51 is bevelled to fit the inclined cam track section 50 and the rear end of the switch 51 is connected by a horizontal pivot 54 to the front end of the horizontal cam track 46. The pivot 54 of the switch permits the latter to swing upwardly and downwardly and the switch is normally maintained in its lower horizontal position by a coil spring 55 arranged at an inclination and extending downwardly from the switch 51 and connected at its upper end at 56 to the same and at its lower end to a bracket 57 suitably secured to and depending from the inclined cam track 50 and having its lower end deflected laterally in an inward direction to facilitate the attachment of the lower end of the coil spring 55. The cam controlled roller 41 rides on the upper face of the switch and the horizontal cam track 46 during the return or backward movement of the depressing assembly and maintains the depressing plate in an elevated position clear of the asparagus form. The upward movement of the roller on the inclined cam track section 50 lifts the depressing plate out of the asparagus form and the momentum of the depressing assembly carries it backward clear of the form as hereinafter fully explained. The cushioning springs 19 at the front ends of the guide rods cushion the depressing assembly at the end of the forward movement thereof and assist the said limited backward movement of the depressing assembly. The inclined cam track section 50 which may be mounted in any suitable manner is preferably provided with upper and lower arms 58 and 59 forming extensions of the horizontal track section 52 and the inclined cam track section 50, respectively, and provided with attaching plates 60 and 61. The attaching plate 60 is disposed horizontally and is bolted or otherwise secured to the lower face of the bottom flange of the channel facia member 6. The attaching plate 61 is bolted or otherwise secured to the lower front longitudinal frame member 62 of the table.

The sectional clamp 30 of the slidable frame is provided with a horizontal transversely disposed arm 63 suitably secured at its outer end to the inner face of the clamp 30 and extending through a longitudinally disposed horizontal slot 64 of the facia member 6 and adapted to be engaged by rollers 65 and 66 of pusher and return sprocket chains 67 and 68 whereby the depressing assembly is positively moved forwardly during the asparagus cutting operation and backwardly to return the depressing assembly for engagement with another asparagus receiving form. The sprocket chains 67 and 68 which are composed of upper and lower horizontal stretches or runs extend longitudinally of the asparagus assorting table and are mounted respectively on sprocket wheels 69 and 70 of head shafts 71 and 72 and on sprocket wheels 73 and 74 of foot shafts 75 and 76. The sprocket wheels 69 and 70 of the head shafts 71 and 72 are fixed to the said shafts while the sprocket wheels 73 and 74 are idler sprocket wheels and are loose on the foot shafts 75 and 76. The head shafts 71 and 72 are journalled in suitable bearings 77 and 78 mounted in approximately U-shaped hangers 79 secured to and depending from the top of the table as clearly illustrated in Fig. 6 of the drawings. The head shafts 71 and 72 are connected by intermeshing gear wheels 80 and 81 which are fixed to the shafts 71 and 72 and which produce rotation of the same in opposite directions so that the upper runs of the sprocket chains move in opposite directions for actuating the depressing assembly in its forward and return movements. The head shaft 71 is driven by an electric motor 82 by means of sprocket gearing consisting of sprocket wheels 83 and 84 and a sprocket chain 85. The motor 82 is suitably mounted on the lower portion of the framework of the table and may be supported in any suitable manner. The sprocket wheel 83 is mounted on the head shaft 71 and rotates in the direction of the arrow in Fig. 2 of the drawings so that the upper flight of the sprocket chain 67 is adapted to actuate the depressing assembly in the forward movement thereof. The sprocket wheel 84 may be mounted directly on the shaft of the motor 82 or may be connected with the same in any other desired manner.

The foot shafts 75 and 76 which are provided with suitable bushings 86 are mounted at their ends in suitable bearings of slides 87 and 88 adapted to be adjusted by screws 89 for taking up any slack in the sprocket chains 67 and 68 and for maintaining the sprocket chains at the desired tension. The slidable bearing element 87 is mounted in a guideway formed by a longitudinal channel bar 90 and a Z-bar 91 secured to the channel member 90 at the inner face of the web portion thereof and cooperating with the bottom flange of the same to form a guideway for the slidable bearing element 87. The slidable bearing element 88 in which the front ends of the foot shafts 75 and 76 are mounted is arranged in a guideway formed by the lower portion of the facia member 6 and a suitable angle clip plate 92 secured to the facia member 6 and partially embracing the slidable bearing element 88. The screws 89 are tapped into the outer ends of the slidable bearing elements 87 and 88 and extend through the upper portion of the table to one end thereof and are provided at their outer ends with heads to enable them to be rotated by a wrench or other tool for adjusting the slidable bearing elements 87 and 88. Guideways for the slidable bearing elements 87 and 88 may however be formed in any other desired manner as will be readily understood. The bores 93 in the outer ends of the slidable bearing elements 87 and 88 are of sufficient length to provide for the necessary tensioning of the sprocket chains 67 and 68.

The upper runs or stretches of the sprocket chains 67 and 68 are supported in a horizontal position by an angle bar 94 having one of its flanges arranged in a horizontal position beneath the upper runs of the sprocket chains 67 and 68 and having its other flange connected by suitable fastening devices with the angle plates 49, spacing blocks 95 being interposed between the angle plates 49 and the vertical flange of the angle bar 94 for arranging the angle bar in proper position for supporting the upper runs of the sprocket chains 67 and 68. The roller 65 of the sprocket chain 67 is firmly supported by approximately triangular side plates 96 secured to the adjacent links of the sprocket chain 67 and the roller 66 of the sprocket chain 68 is supported by similar side plates 97. The transverse arm or member 63 of the depressing assembly extends over and slightly beyond the inner edge of the angle bar 94 and occupies a position to be engaged by the rollers 65 and 66. The actuating roller 65 of the endless chain which carries the depressing assembly forward disengages itself from the transverse member 63 in passing downward around the sprocket wheel 73 of the foot shaft 75 leaving the transverse member 63 free to be engaged by the roller 66 of the other sprocket chain for actuating the depressing assembly in the backward return movement.

The disk cutter 11 is mounted on the shaft 98 of an electric motor 99 which is adjustably supported by vertical screws 100 having a threaded adjustment in brackets 101 bolted or otherwise secured to a base plate 102 and composed of vertical legs 103, a horizontal top portion 104 having an extension 105 in which one of the screws 100 is mounted. The adjusting screws 100 are swiveled at their upper ends in lugs 106 of bands 107 which surround the casing of the electric motor 99 and are adapted to adjust the motor vertically and the disk knife so that the latter may be properly positioned for accurately cutting the asparagus spears. The adjusting screws 100 may however be mounted in any other desired manner for this purpose. The electric motor 99 which rotates the disk knife is provided with an emergency stop brake bar 108 having an operating lever 109 and adapted to enable the knife to be instantly stopped should such action become necessary. A suitable knife guard 110 of substantially semicircular form extends over the top and around the upper portion of the disk cutter to prevent accidental contact with the disk cutter. The knife guard 110 is supported by angle brackets 111 having upper and lower horizontal portions and an intermediate vertical portion, the lower horizontal portion being bolted or otherwise secured to the table portion and the upper horizontal portion extending beneath and having the knife guard mounted on it.

In order to enable the asparagus receiving form to be accurately placed on the asparagus table a safe distance from the disk knife a vertically movable stop pin 112 is provided and is guided in a suitable opening 113 in the table top. The upper end of the stop pin normally projects above the upper face of the metal deck 3 of the top of the table and its lower end is connected by a suitable pivot 114 to one arm of a lever 115 fulcrumed intermediate of its ends at 116 beneath the top of the table to form two arms and provided at its other arm with a roller 117. The pin 112 is located at one end of the lever and the roller 117 is mounted in a fork or bifurcation 118 of the other end of the lever which is engaged adjacent the said fork or bifurcation by a leaf or plate spring 119 adapted to assist in maintaining the stop pin 112 normally in a projecting position so as to form a stop for the asparagus receiving form.

Figures 8, 11:
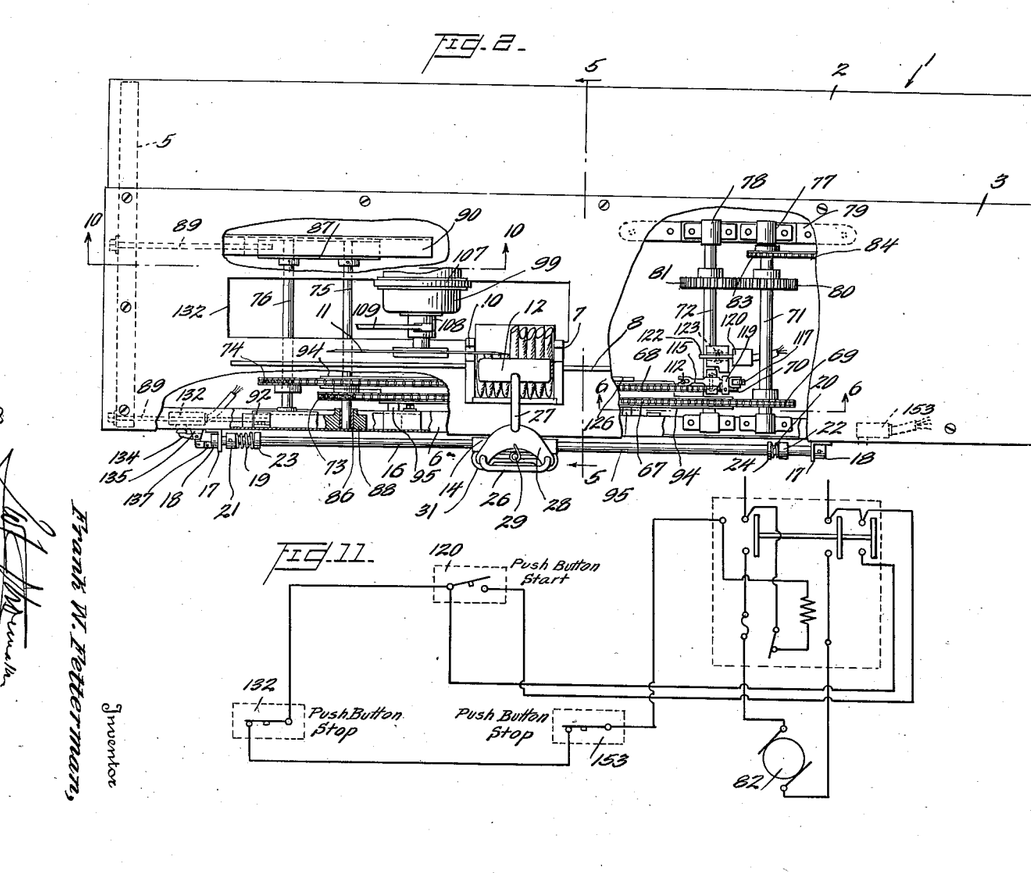
Fig. 11 is a view of the electrical wiring diagram showing the control of the motor by the switches.
Figure 10:
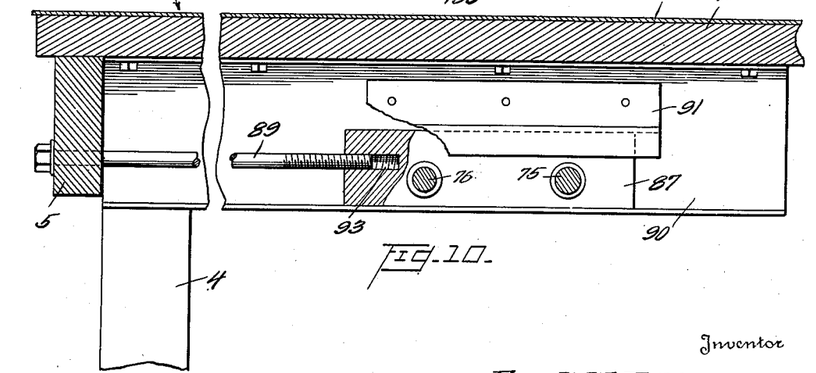
Fig. 10 is a detail longitudinal sectional view taken substantially on the line 10—10 of Fig. 2.

The electric motor 82 which supplies the power for actuating the depressing assembly is controlled by the motor control illustrated diagrammatically in Fig. 11 of the drawings which motor control includes a starting switch 120 having a push button 121 or other suitable operating means adapted to be operated by a lever 122 located adjacent the safety stop pin 112 and fulcrumed intermediate of its ends at 123 in a suitable bracket 124 and having upper and lower arms. The upper arm is arranged to extend through a slot 125 in the top of the table and project slightly above the same and the lower arm extends beneath the push button 121 and is adapted to operate the same when the upper arm of the lever 122 is depressed by the placing of an asparagus form upon the top of the table contiguous to the safety stop pin. The operation of the starting switch 120 starts the motor 82 and causes the roller 66 of the sprocket chain 68 to engage the transverse member 63 of the depressing assembly and move the latter in a backward direction. This movement carries an operating arm 126 into engagement with the roller 117 of the lever 115 and withdraws the safety stop pin 112 from its projecting position to permit the asparagus form to be carried forward by the depressing assembly. The backward movement of the depressing assembly carries the cam controlled roller 41 beyond the rear end of the cam track 46 and permits the roller to drop and the depressing plate to be carried downwardly from an elevated position above the asparagus form into engagement with the asparagus spears. The weight of the depressing plate 12 and the yoke 25 together with the depressing spring 29 carries the depressing plate downwardly into firm engagement with the asparagus spears. The roller 65 is then carried by the endless sprocket chain 67 into engagement with the transverse member 63 and moves the depressing assembly together with the asparagus form forwardly. The arm 126 preferably consists of a square rod provided with a bevelled end 127 for engaging the roller 117 to enable the roller 117 to be readily lifted and the lever 115 swung on its pivot to depress the projecting stop pin 112. The arm 126 is preferably provided at its other end with a set collar or sleeve 128 formed integral with the arm 115 or otherwise rigidly connected with the same and carrying a clamping screw 129 for engaging the transverse member 63. The set collar or sleeve 128 is clamped on the inner or rear end of the transverse member 63 of the depressing assembly.

Figure 1:
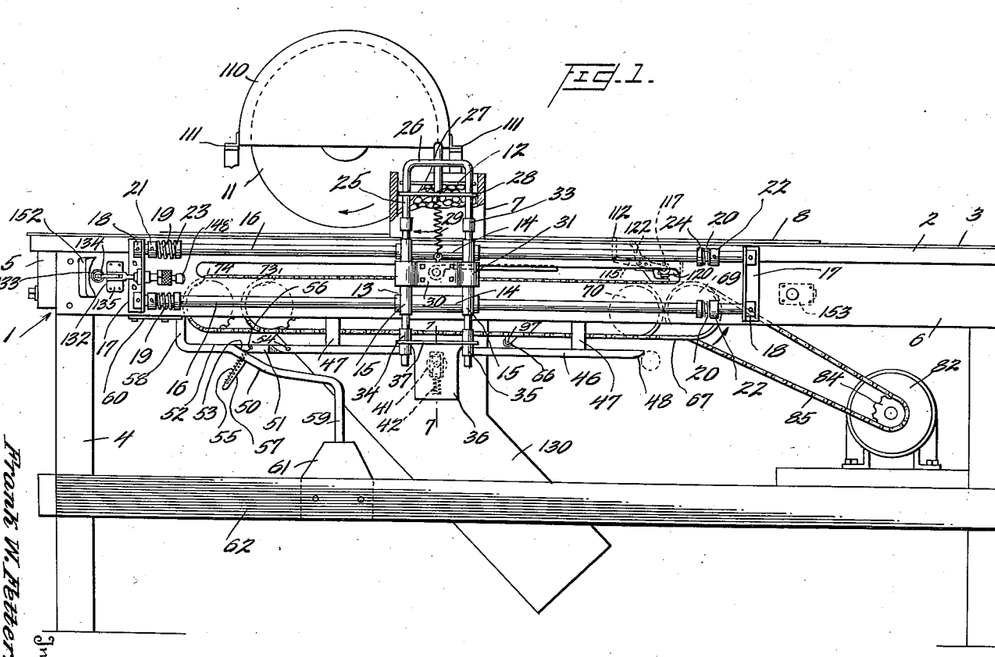
Fig. 1 is a front side elevation of an asparagus trimming machine constructed in accordance with this invention.
Figure 3:
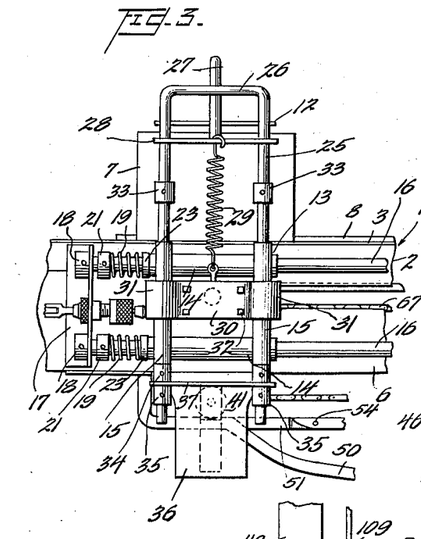
Fig. 3 is an enlarged detail elevation of the safety asparagus depressing mechanism illustrating the position of the same at the end of the forward movement.
Figure 4:
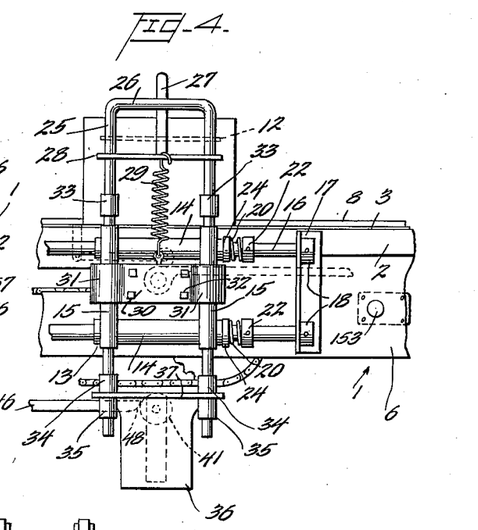
Fig. 4 is a similar view illustrating the position of the safety depressing mechanism at the end of the backward movement.
Figure 5:
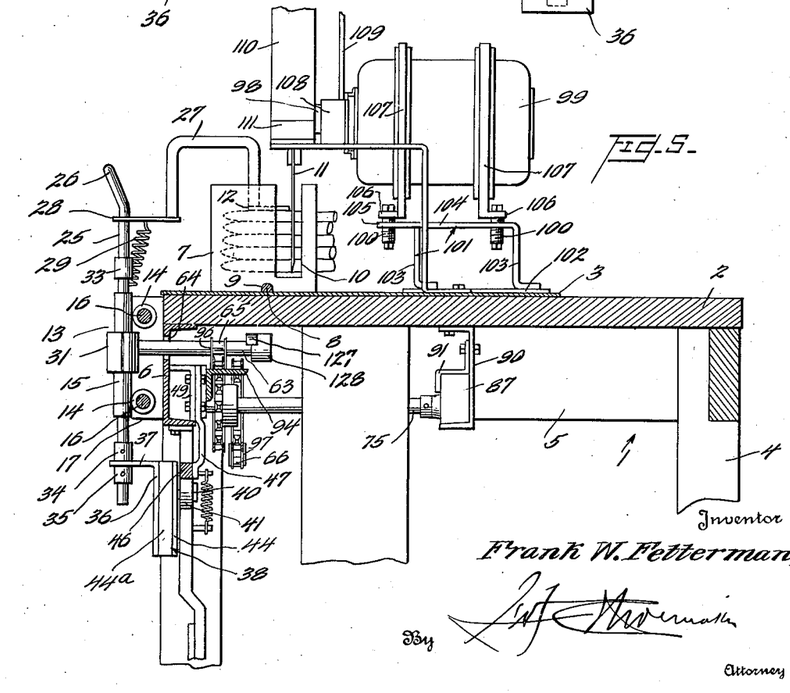
Fig. 5 is a transverse sectional view taken substantially on the line 5—5 of Fig. 2.
Figure 6:
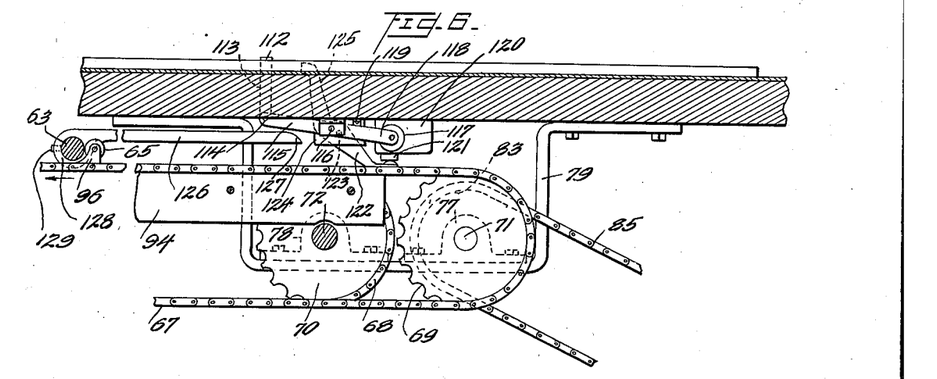
Fig. 6 is a longitudinal sectional view taken substantially on the line 6—6 of Fig. 2.
Figures 7, 8, 9:
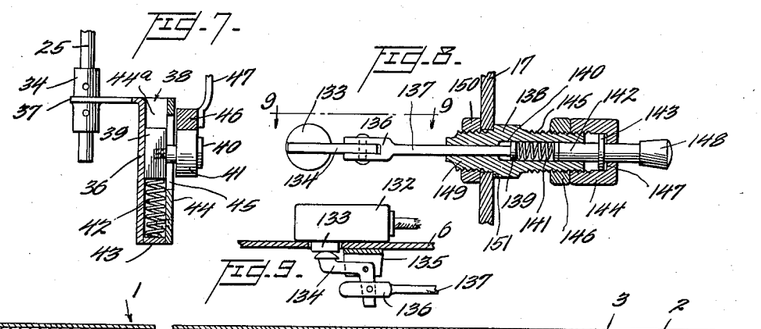
Fig. 7 is a detail sectional view on the line 7—7 of Fig. 1.
Fig. 8 is a detail sectional view of the safety stop switch assembly for automatically stopping the mechanism at the end of a forward movement of the same.
Fig. 9 is a detail sectional view on the line 9—9 of Fig. 8.

The forward movement of the depressing assembly carries the asparagus form past the disk knife 11 which rotates in the direction of the arrow in Fig. 1 of the drawings and which accurately severs the superfluous butts from the asparagus spears and cuts the latter to the proper length to suit canning or other packing requirements. The severed butts are discharged into an inclined chute 130 which extends downwardly from an opening 131 in the top of the table. After the butts have been trimmed from the asparagus spears the slidable frame is carried into engagement with operating means of a push button stop switch 132 having a push button 133 which is actuated by the bell crank lever 134 fulcrumed at its angle in a supporting bracket 135 and having one of its arms arranged to engage the push button 133 and its other arm arranged in a fork or bifurcation 136 of a rod 137 slidably mounted in a barrel 138 and provided at its inner end with a collar 139 forming a head and operating in a counterbore 140 of the barrel. The counterbore of the barrel receives a spiral cushioning spring 141 which is interposed between a plunger 142 and the collar or head 139 of the forked rod 137. The plunger is provided between its ends with a collar 143 which is arranged within an adjustable cylindrical head 144 through which the plunger 142 passes. The barrel is exteriorly threaded at 145 to receive the adjustable head 144 and a lock nut 146. The cylindrical head 144 is interiorly threaded to engage the threaded portion 145 of the barrel and it has a shoulder 147 at its outer end to form a stop for the collar 143 of the plunger rod 142. The plunger rod extends beyond the adjustable head 144 and is provided with a bumper cap 148 preferably threaded on the projecting end of the plunger rod. The threads 145 extend inwardly from one end of the barrel and the other end 149 of the barrel is also threaded to receive a clamping nut 150. The barrel is reduced at 151 adjacent the reduced threaded terminal portion 149 to form a shoulder and also a smooth portion which extends through the projecting flange of the adjacent bracket 17 as clearly illustrated in Figs. 1 and 8 of the drawings. The push button stop switch is arranged within a suitable housing 152 and when operated cuts off the power from the motor to stop the mechanism. The momentum of the depressing assembly carries the latter forwardly a sufficient distance beyond the asparagus form to clear the same and permit the ready removal of the form from the asparagus trimming machine. As previously explained the depressing plate is lifted by the inclined cam track 50 at the completion of the cutting or trimming operation so that the depressing assembly is disengaged from and is adapted to move forward independently of the asparagus form when the push button stop switch 132 is operated.

The motor control is also provided with an emergency stop switch 153 which is manually operable to stop the mechanism whenever desired. The operation of the motor control will be readily understood from the wiring diagram illustrated in Fig. 11.

Figure 12:
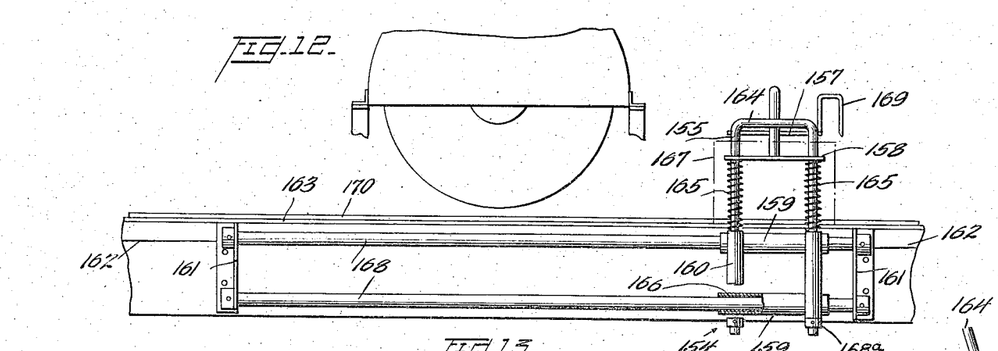
Fig. 12 is a front elevation of a manually operable safety asparagus trimming machine.
Figure 13:
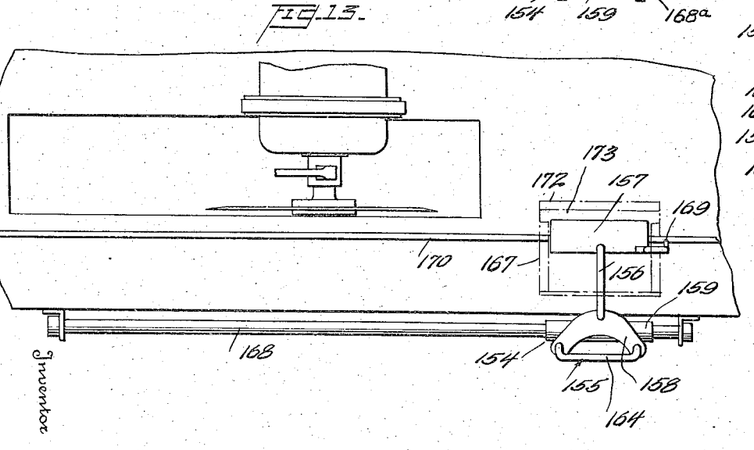
Fig. 13 is a plan view of the same.
Figure 14:
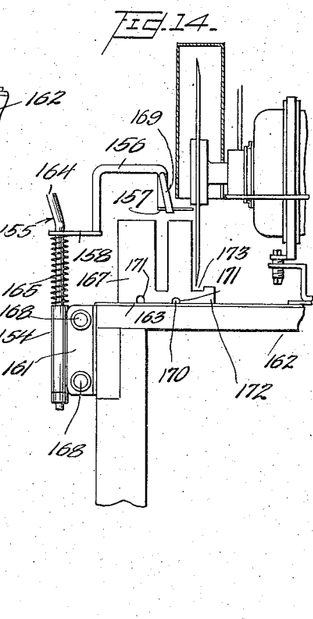
Fig. 14 is an end elevation partly in section of the manually operable machine shown in Fig. 12.

Referring particularly to Figs. 12 to 14, inclusive, of the drawings, in which is illustrated a manually operable asparagus trimming machine having a safety depressing device, the depressing assembly comprises in its construction a slidable carriage or frame 154, a vertically slidable yoke 155 and an offset approximately inverted U-shaped arm 156 disposed transversely of the machine and carrying at its inner end a depressing pad 157 and connected at its outer end with the sides of the yoke 155 by an approximately arcuate plate 158 constructed and arranged substantially as the plate 28 heretofore described. The slidable frame or carriage 154 consists of upper and lower spaced horizontally disposed sleeves 159 and spaced vertical sleeves 160 connected with the horizontal sleeves adjacent the ends thereof and slidably receiving the sides of the yoke 155. The upper and lower horizontal sleeves 159 are slidably mounted on parallel upper and lower guide rods 168 which are supported by end brackets 161 of substantially the same construction as the brackets 17 heretofore described and bolted or otherwise secured to the front side of the table 162. The table 162 which may be of any desired construction is preferably provided at its top with a metal deck 163. The plate 158 which constitutes the connection between the offset arm and the yoke is pierced at its ends by the sides of the yoke and it is spaced from the top connecting portion 164 of the yoke. The upper portion of the yoke which projects above the plate 158 is deflected slightly and inclined upwardly and outwardly and it constitutes a handle for facilitating the manual manipulation of the depressing assembly. To assist the manual operation of the depressing assembly coiled springs 165 are disposed on the sides of the yoke and are interposed between the upper ends of the vertical sleeves and the horizontal plate 158. The horizontal sleeves 159 are provided with bushing bearings 166 but any other suitable bearings may be provided for reducing the friction incident to the reciprocation of the slidable frame or carriage on the guide rods 168. While the springs 165 may be dispensed with and the depressing pad raised and lowered entirely by hand, it is preferable to employ the springs 165 which assist the operator in the manipulation of the depressing assembly.

The depressing plate is adapted to be lowered into an asparagus form 167 and is firmly maintained in engagement with the asparagus spears or other contents of the form by the downward pressure exerted by the operator and when the handle 164 is released by the operator the springs 165 will automatically lift the depressing plate and elevate the same above the form as clearly illustrated in Fig. 12 of the drawings. The upward movement of the depressing plate and the yoke is limited by adjustable set collars 168ª arranged on the lower ends of the sides of the yoke 155.

In order to enable the depressing assembly to slide the form 167 to carry the contents thereof to the disk knife the depressing pad 157 which consists of a horizontal oblong plate is provided at the rear end with an inverted approximately U-shaped hook 169 conveniently located at the outer rear corner of the depressing pad and arranged to engage the side wall of the form 167 when the depressing yoke and the depressing pad are lowered from the elevated position illustrated in Fig. 12 of the drawings. When the hook 169 is engaged with the form the latter is adapted to be carried to the cutting element without danger of the hand or hands of the operator coming in contact with the disk knife.

The form 167 is preferably guided by a form guide rail 170 mounted upon the top of the table and arranged to engage grooves 171 in the lower face of the bottom of the form 167. A pair of grooves is preferably provided for accurately guiding the asparagus receiving form. One of the grooves 171 cooperates with the guide rail 170 when the disk knife is arranged as shown in Fig. 14 and the other guide groove 171 cooperates with the guide rail 170 when the form is arranged like that illustrated in Fig. 5 of the drawings. The knife preferably severs the superfluous butts of the asparagus from the asparagus spears at the open rear side of the form as clearly illustrated in Fig. 14 of the drawings and the form 167 which is constructed substantially the same as the asparagus receiving form heretofore described is provided with a bottom extension 172 having a groove 173 in its upper face into which the cutting edge of the disk knife projects.

While the machine illustrated in Figs 1 to 11, inclusive, of the drawings is designed to be normally mechanically operated and while the same may be manually operated, the machine illustrated in Figs. 12 to 14, inclusive, provides a light, easily operated structure which may be manually manipulated by an operator with perfect ease and without any liability of the hands of the operator accidentally coming in contact with the cutting element as the depressing assembly may be engaged with the asparagus form at a safe distance from the knife disk and may be carried a safe distance beyond the knife disk after the cutting operation so that there will be no danger to the operator in placing the form on the machine and in removing it therefrom.

What I claim is:

1. In a machine of the class described, a depressing assembly including a cutting element, a slidably mounted reciprocable carriage movable along the machine and an open top receptacle spaced from one side of the carriage and also movable along the machine, a movable member slidably mounted on the carriage for downward and upward movement and having a portion extending laterally from the carriage and provided with a depressing pad laterally offset from the carriage and arranged to be carried by the downward movement of the member into and out of the open top receptacle for holding in a compressed condition material within the receptacle while the same is being carried by the carriage to the cutting element and said pad being adapted to be lifted from the receptacle by the upward movement of the member.

2. In a machine of the class described, a cutting element and a receptacle movable along the machine past the cutting element, a depressing assembly including a carriage and a depressing pad slidably mounted thereon for vertical movement to carry it into pressing engagement with material to be cut and to lift it therefrom after the cutting operation, said pad being laterally offset from the carriage to enable it to extend into the receptacle and move the same along the machine when the carriage is actuated, and means for guiding and slidably reciprocating the carriage for enabling the same to move the material in a compressed condition to the cutting element for cutting the material.

3. In a machine of the class described, a cutting element and a receptacle movable along the machine past the cutting element, a depressing assembly including a slidably mounted reciprocable carriage, a depressing pad slidably mounted for vertical movement on and laterally offset from the carriage to enable the pad to move downwardly into the receptacle into pressing engagement with the material to be cut and to be lifted therefrom after the cutting operation, said pad being adapted to move the receptacle along the machine when the carriage is actuated, and means for guiding the carriage to enable the depressing assembly to actuate the carriage and hold the material in a compressed condition while the same is being carried to the cutting element.

4. In a machine of the class described, a cutting element, an open top receptacle movable along the machine past the cutting element, a depressing assembly including a horizontally slidable reciprocable carriage, a member slidably mounted on the carriage for vertical movement and having an offset portion extending laterally from the carriage and provided with a depressing pad adapted to be carried by the vertical movement of said member into and out of the open top receptacle for actuating the latter and for holding the material in the receptacle in a in a depressed condition while it is being carried to a cutting element by the depressing assembly.

5. In a machine of the class described, a cutting element, an open top receptacle movable along the machine past the cutting element, a depressing assembly including a carriage, a member mounted on the carriage for vertical movement and extending laterally from the carriage and having an approximately inverted U-shaped arm provided with a depressing pad adapted to be carried by the vertical movement of said member into and out of the open top receptacle at one side of the carriage for holding material in the receptacle in a compressed condition and for moving the receptacle and the material with the carriage to carry the material to the cutting element.

6. In a machine of the class described, a cutting element, a table provided with spaced upper and lower horizontal guide rods, a receptacle movable along the table, a depressing assembly including a carriage having spaced upper and lower horizontal sleeves and spaced vertical sleeves, the horizontal sleeves being slidable on the guide rods, a depressing pad and a yoke member carrying the depressing pad and having spaced sides slidable in the said vertical sleeves to lower the pad into the receptacle in compressing engagement with material to be cut and for holding the material in compressed condition while it is being carried to the cutting element by the sliding movement of the carriage on the horizontal guide rods.

7. In a machine of the class described, a cutting element, a depressing assembly including a carriage, a receptacle movable along the machine at one side of the carriage in spaced relation thereto, a yoke mounted on the carriage for downward and upward movement and having an upper handle portion and provided with a member extending laterally from the yoke, a depressing pad offset from the yoke and connected with the laterally extending member and carried by the yoke in its downward and upward movements to move it downwardly into a receptacle into compressing engagement with material to be cut and to lift it therefrom, and a spring for urging the yoke and the depressing pad downwardly.

8. In a machine of the class described, a cutting element, a receptacle movable along the machine past the cutting element, a depressing assembly including a slidably mounted reciprocable carriage and a depressing member extending laterally from the carriage and having a depressing pad and mounted slidably on the carriage for downward and upward movement to lower the depressing pad into the receptacle located at one side of the carriage and containing material to be cut, the upward movement of the depressing assembly operating to lift the pad from the depressing assembly, means for moving the depressing assembly to carry the same and the material to the cutting element for cutting the material, and means for lifting the depressing pad from the receptacle after the cutting of the material.

9. In a machine of the class described, a cutting element, a receptacle movable along the machine past the cutting element, a depressing assembly including a slidably mounted reciprocable carriage and a depressing member extending beyond the carriage and having a depressing pad and mounted slidably on the carriage for downward and upward movement to lower the depressing pad into the receptacle containing material to be cut, the upward movement of the depressing assembly operating to lift the pad out of the receptacle, means for moving the carriage to carry the material to the cutting element for cutting the material, means for maintaining the depressing member in a lowered position with a depressing pad in engagement with the material while the latter is being cut, and means for lifting the depressing pad from the receptacle after the cutting of the material.

10. In a machine of the class described, a cutting element, a receptacle movable along the machine past the cutting element, a depressing assembly including a slidably mounted reciprocable carriage, a depressing member extending beyond the carriage and having a depressing pad and slidably mounted for downward and upward movement on the carriage to lower the depressing pad into the receptacle containing the material to be cut, the upward movement of the depressing assembly operating to lift the pad out of the receptacle, means for moving the carriage to carry the material to the cutting element, and means for lifting the depressing pad from the receptacle after the cutting of the material and for causing the depressing assembly to travel beyond the receptacle to permit the removal of the latter.

11. In a machine of the class described, a cutting element, a receptacle movable along the machine past the cutting element, a depressing assembly including a slidably mounted reciprocable carriage, a depressing member extending beyond the carriage and having a depressing pad and slidably mounted for downward and upward movement to lower the pad into engagement with material to be cut, means for moving the carriage forwardly and backwardly, means for holding the depressing pad in engagement with the material during the forward movement of the carriage while the material is being cut, and means for elevating the depressing pad from the material after the same is cut and for holding the pad in an elevated position during backward return movement of the depressing assembly.

12. In a machine of the class described, a table, a cutting element, a receptacle movable along the table past the cutting element, a depressing assembly including a slidably mounted reciprocable carriage mounted for forward and backward movement on the table, a depressing member extending beyond the carriage and having a depressing pad and mounted for downward and upward movement on the carriage to carry the pad into engagement with material to be cut, endless flexible elements having oppositely moving portions provided respectively with means for moving the carriage forwardly and backwardly and for automatically releasing the carriage at the end of their respective carriage actuating movements, and means located in the path of the depressing assembly for holding the pad in its lowered position in engagement with material during forward movement of the assembly.

13. In a machine of the class described, a table, a cutting element, a receptacle movable along the table past the cutting element, a depressing assembly including a reciprocable carriage slidably mounted for forward and backward movement on the table, a depressing member extending beyond the carriage and having a depressing pad and mounted for downward and upward movement on the carriage to carry the pad into engagement with material to be cut, endless flexible elements having oppositely moving portions provided respectively with means for moving the carriage forwardly and backwardly and for automatically releasing the carriage at the end of their respective carriage actuating movements, and means for elevating the pad after cutting of the material and for supporting the pad in an elevated position during the backward return movement of the assembly.

14. In a machine of the class described, a table, a cutting element, a receptacle movable along the table past the cutting element, a depressing assembly including a reciprocable carriage slidably mounted for forward and backward movement on the table, a depressing member extending beyond the carriage and having a depressing pad and mounted for downward and upward movement on the carriage to carry the pad into engagement with material to be cut, endless flexible elements having oppositely moving portions provided respectively with means for moving the carriage forwardly and backwardly and for automatically releasing the carriage at the end of their respective carriage actuating movements, means located in the path of the depressing member for holding the pad in its lowered position in engagement with the material during the forward movement on the assembly, and means for elevating the pad and for supporting the same in an elevated position during backward return movement of the assembly.

15. In a machine of the class described, a cutting element, a receptacle movable along the machine past the cutting element, a support, a depressing assembly including a reciprocable carriage slidably mounted for forward and backward movement on the support and a depressing member extending beyond the carriage and having a depressing pad and mounted for downward and upward movements on the carriage to carry the pad into and out of engagement with material to be cut, endless sprocket chains mounted in a horizontal position on the support, the latter having a portion extending beneath the upper run of the sprocket chains for supporting the same in a horizontal position, said sprocket chains being provided respectively with means for moving the depressing assembly forwardly and backwardly and means for automatically releasing the carriage at the end of their respective carriage actuating movements, and means for holding the depressing pad in its lowered position during forward movement of the depressing assembly and for elevating the depressing pad and for supporting the same in its elevated position during backward movement of the depressing assembly.

16. In a machine of the class described, a cutting element, a receptacle movable along the machine past the cutting element, a support, a depressing assembly including a carriage mounted for backward and forward movements on the support and a depressing member extending beyond the carriage and having a depressing pad and mounted for downward and upward movement on the carriage to engage the depressing pad with material to be cut and to lift it therefrom, an arm extending from the carriage, oppositely moving sprocket chains having runs located adjacent the said arm of the carriage and extending in the direction of the movements of the carriage and provided respectively with means for engaging the said arm for moving the carriage forwardly to carry the depressing assembly and the material to be cut to the cutting element and for moving the depressing assembly backwardly after the cutting operation.

17. In a machine of the class described, a cutting element, a receptacle movable along the machine past the cutting element, a support, a depressing assembly including a reciprocable carriage slidably mounted for forward and backward movement on the support and a member extending beyond the carriage and having a depressing pad and slidably mounted for vertical movement on the carriage to move the pad downwardly into the receptacle and into engagement with material to be cut, the upward movement of the said member operating to lift the pad from the material, a horizontal track element disposed in the direction of the movement of the carriage, and means for causing the vertically movable member to engage with the lower face of the track member during forward movement of the carriage to maintain the depressing pad in engagement with the material and for causing said vertically movable member to engage with the upper face of the track member to support the depressing pad in an elevated position during backward movement of the carriage.

18. In a machine of the class described, a cutting element, a receptacle movable along the machine past the cutting element, a support, a depressing assembly including a reciprocable carriage slidably mounted on the support for backward and forward movements, a member slidably mounted for vertical movement on the carriage and extending from the side of the carriage and having a depressing pad arranged to be carried into the receptacle into engagement with material to be cut by downward movement of said member and adapted to be lifted from the receptacle by upward movement of said member, means for moving the carriage backwardly and forwardly, a horizontal track disposed in the direction of the movement of the carriage and arranged to be engaged by the vertically movable member for maintaining the depressing pad in engagement with the material during forward movement of the carriage and for supporting the depressing pad in an elevated position during backward movement of the carriage and an inclined cam track arranged to lift the vertically movable member and cause the same to engage the upper face of the track during backward movement of the carriage.

19. In a machine of the class described, a support, a depressing assembly including a carriage mounted for forward and backward movement on the support, a depressing member mounted for upward and downward movement on the carriage and having a depressing pad arranged to be carried into engagement with material to be cut by the downward movement of the member and to be lifted from the material by the upward movement of the member, means for moving the carriage forwardly and backwardly, a track engaging element carried by the depressing member, a horizontal cam track arranged to be engaged above and below by the said element for holding the depressing pad in engagement with the material and for supporting the depressing pad in an elevated position, an inclined cam track located at the front portion of the horizontal track and spaced therefrom and arranged to be engaged by said track engaging element to lift the pad from the material, and a movable switch member bridging the space between the horizontal track and the inclined cam track and arranged to be opened by the upward movement of the said element and closeable automatically for causing the said element in the backward movement of the carriage to bridge the space between the tracks and be supported by the horizontal track.

20. In a machine of the class described, a support, a depressing assembly including a carriage mounted for forward and backward movement on the support and a depressing member mounted for downward and upward movement on the carriage and provided with a depressing pad, a roller carried by the depressing member, a horizontal track member located in the path of the roller and arranged to be engaged below and above by the same, an inclined cam track member also arranged in the path of the roller and arranged to lift the roller and the depressing member at the end portion of the forward movement of the carriage, and an automatically closing switch pivoted to the front end of the horizontal track member and normally extending from the same to the inclined track member, said switch after passage of the roller being adapted to close the roller during the backward movement of the carriage to travel on to the horizontal track member to support the pad in an elevated position during such backward movement.

21. In a machine of the class described, a table having a metal facia member, a horizontal cam track hung from the facia member, a depressing assembly including a carriage movable forwardly and backwardly, a yoke slidable vertically on the carriage and provided with a depressing pad, guiding means for the carriage supported by the facia member, a bracket connected with the yoke and provided with a vertical guideway, a cushioned slide mounted in the guideway of the bracket, a roller mounted on the slide and arranged to engage the horizontal cam track above and below for holding the depressing pad in engagement with material to be cut and for supporting the depressing pad in an elevated position out of engagement with the material, means for moving the carriage forwardly and rearwardly, and means for transferring the roller from the lower face of the cam track to the upper face thereof at the end portion of the forward movement of the carriage.

22. In a machine of the class described, a support having a metal facia member provided with a longitudinal slot, a depressing assembly including a carriage mounted for backward and forward movement and a vertically movable yoke having spaced sides slidable on the carriage, said yoke being provided with a depressing pad adapted to be carried into and out of engagement with material to be cut by the vertical movement of the yoke, a sectional clamp secured to the sides of the yoke and provided with a transversely disposed member extending through the slot of the facia member, and endless sprocket chains moving in opposite directions and provided with projecting rollers arranged to engage the transverse member for moving the carriage backwardly and forwardly.

23. In a machine of the class described, a table provided with a track adapted for guiding to a cutting element a receptacle containing material to be cut, a movable stop normally arranged in a projecting position adjacent the track and adapted to be engaged by a receptacle for limiting the forward movement of the same on the track in initially placing the receptacle on the table, a depressing assembly including a carriage mounted on the table for backward and forward movement and a depressing member mounted on the carriage for upward and downward movement and having a depressing pad arranged to be carried into the receptacle by the downward movement of the depressing member, means connected with the stop for moving the same from its vertical position to permit forward movement of the receptacle, and means carried by the carriage for operating the stop operating means.

24. In a machine of the class described, a cutting element, a table, a receptacle movable along the table past the cutting element, a vertically movable stop normally projecting above the table and arranged to limit the forward movement of the receptacle in initially placing the same on the table, a lever connected with the stop, a depressing assembly including a carriage movable forwardly and backwardly and a depressing member mounted on the carriage for downward and upward movement and having a depressing pad arranged to be carried into the receptacle by the downward movement of the depressing member, and an arm extending from the carriage and arranged to actuate said lever for withdrawing the movable stop from its projecting position.

25. In a machine of the class described, a cutting element, a table, a receptacle movable along the table past the cutting element, a depressing assembly including a reciprocable carriage slidably mounted on the table for forward and backward movement and a depressing member extending beyond the carriage and mounted on the carriage for downward and upward movement and provided with a depressing pad arranged to be carried into the receptacle at one side of the carriage by the downward movement of the depressing member, means for actuating the carriage to move the same and the receptacle and for automatically releasing the carriage at the end of the forward movement including an electric motor, a starting switch for the motor, and means arranged to be actuated by the placing of a receptacle on the table for operating the switch to start the motor and for causing the carriage to return to a starting position and for automatically engaging the depressing pad with the receptacle to cause the receptacle to move forwardly with the carriage.

26. In a machine of the class described, a cutting element, a table, a receptacle movable along the table and past the cutting element, a depressing assembly including a slidably mounted reciprocable carriage movable back and forth on the table and having a depressing pad arranged to be introduced into a receptacle for compressing material to be cut, and means for actuating the carriage and for releasing the same at the end of its forward movement including a motor, a starting switch for the motor located adjacent the rearward limit of the movement of the carriage, operating means for the starting switch having a movable lever fulcrumed intermediate its ends to form two arms, one of the arms being arranged to actuate the starting switch and the other arm normally projecting above the top of the table and arranged to be depressed by a receptacle placed on the table, whereby the motor will be automatically started after a receptacle containing the material to be cut is placed in position on the table and the carriage caused to move rearwardly to the limit of its backward movement and then forwardly, and means for automatically moving the depressing pad into engagement with the receptacle on such forward movement of the carriage.

27. In a machine of the class described, a table having a track for guiding a receptacle to a cutting element, a depressing assembly including a carriage movable backwardly and forwardly along the table and having a depressing pad arranged to extend into a receptacle containing the material to be cut, a stop located adjacent the said track and arranged to be engaged by a receptacle to limit the forward movement thereof and enable the receptacle to be properly positioned on the table, and means for actuating the carriage including a motor, a starting switch for the motor, means for operating the starting switch provided with a depressible member normally projecting above the top of the table and located adjacent said stop, whereby when a receptacle is placed on the table adjacent the stop the depressible member will be actuated to operate the starting switch, and operating means for withdrawing the stop from its projecting position including a member mounted on the carriage and arranged to function after the carriage has been set in motion by the operation of the starting switch.

28. In a machine of the class described, a table provided with a track for guiding to a cutting element a receptacle containing material to be cut, a depressing assembly including a carriage movable forwardly and backwardly on the table and having a depressing pad arranged to extend into the receptacle and compress the material to be cut, means for actuating the carriage including a motor, a starting switch for the motor, switch operating means located adjacent the track and arranged to be actuated by a receptacle placed on the table whereby the motor will be started by a receptacle in position on the track, a stop switch, and stop switch operating mechanism arranged to be actuated by the carriage at the end of the forward movement to stop the machine after each individual cutting operation.

29. In a machine of the class described, a cutting element, a receptacle movable along the machine past the cutting element, a depressing assembly including a slidably mounted reciprocable carriage movable along the machine, a depressing member extending laterally from the carriage and having a depressing pad and slidably mounted for downward and upward movements on the carriage to lower the depressing pad into the receptacle containing material to be cut, the upward movement of the depressing assembly operating to lift the pad from the receptacle, means for reciprocating the depressing assembly to carry the same and the material to a cutting element for cutting the material, and means for maintaining the depressing member in its lowered position with the depressing pad in engagement with the material while the latter is being cut.

30. In a machine of the class described, a depressing assembly including a slidably mounted reciprocable carriage movable along the machine and a receptacle also movable along the machine, a member mounted on the carriage for downward and upward movements and extending laterally to a point beyond the carriage and having a depressing pad spaced laterally from the carriage and arranged to be carried into and out of engagement with material in the receptacle to be cut by the downward and upward movements of said member and movable with the carriage whereby the depressing pad is adapted to hold the material in a depressed condition within the receptacle while the pad and the receptacle are being conveyed by the carriage to a cutting element for cutting the material.

31. In a machine of the class described, a cutting element, a depressing assembly including a slidably mounted reciprocable carriage, a receptacle movable along the machine at one side of the carriage, a depressing member slidably mounted on the carriage for downward and upward movements and extending laterally from the carriage, a depressing pad carried by the depressing member in the upward and downward movements thereof to insert it into the receptacle into pressing engagement with material to be cut and to lift it therefrom, and spring means for urging the depressing member in the direction of one of said movements.

32. In a machine of the class described, a table, a cutting element, a track arranged at the top of the table and extending past the cutting element, an open top receptacle movable along the track, a slidably mounted reciprocable carriage, a member slidably mounted on the carriage for downward and upward movement and having a depressing pad arranged to be carried by the downward movement of said member into the open top receptacle for holding material within the receptacle while the same is being carried to the cutting element, and a hook extending from the depressing pad and arranged to be carried by the downward and upward movement of said member into and out of engagement with the receptacle for causing the receptacle to be carried with the carriage to the cutting element.

FRANK W. FETTERMAN.